(12) United States Patent
Cui

(10) Patent No.: US 6,249,518 B1
(45) Date of Patent: Jun. 19, 2001

(54) TDMA SINGLE ANTENNA CO-CHANNEL INTERFERENCE CANCELLATION

(75) Inventor: Jian Cui, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/130,312

(22) Filed: Aug. 7, 1998

(51) Int. Cl.$^7$ .................................................. H04B 7/212
(52) U.S. Cl. ......................... 370/347; 370/201; 455/501
(58) Field of Search .................................. 370/347, 337, 370/201, 203, 204, 205, 206, 208, 252, 268, 269, 503, 512, 514, 292; 375/142, 346, 340, 329, 332, 324, 254, 285; 455/501, 63

(56) References Cited

U.S. PATENT DOCUMENTS

| | | | |
|---|---|---|---|
| 5,345,476 | * 9/1994 | Tsujimoto | 375/233 |
| 5,504,783 | * 4/1996 | Tomisato et al. | 375/267 |
| 5,537,443 | * 7/1996 | Yoshino et al. | 375/340 |
| 5,734,647 | * 3/1998 | Yoshida et al. | 370/335 |
| 5,757,844 | * 5/1998 | Fukawa et al. | 375/200 |
| 5,768,254 | * 6/1998 | Papadopoulos et al. | 370/201 |
| 5,995,565 | * 11/1999 | Tong et al. | 375/346 |
| 6,111,910 | * 8/2000 | Cui et al. | 375/142 |

OTHER PUBLICATIONS

Harry Leib, "Data–Aided Noncoherent Demodulation of DPSK", IEEE Transactions on Communications, vol. 43, No. 2/3/4 1995, pp. 722–725.

K. Giridhar, et al. "Joint Demodulation of Cochannel Signals Using MLSE and MAPSD Algorithms", IEEE 1993, pp. 160–163.

K. Giridhar, et al. "Joint Estimation Algorithms for Cochannel Signal Demodulation", IEEE 1993, pp. 1497–1501.

\* cited by examiner

*Primary Examiner*—Alpus H. Hsu
*Assistant Examiner*—Brian Nguyen
(74) *Attorney, Agent, or Firm*—Dennis R. Haszko; Smart & Biggar

(57) ABSTRACT

A demodulator, within a receiver attached to a single antenna, that cancels co-channel interference within a time division multiple access (TDMA) communication system is disclosed. The demodulator takes as input a series of received signals comprising an information signal and a co-channel interference signal, both using the π/4-differential quadrature phase shift keying (DQPSK) modulation protocol. During a training period, in which the information signals corresponds to a known SYNC word, the demodulator estimates the fading coefficients corresponding to the information and interference signals. After the completion of the training period, the demodulator uses these estimates to generate accurate estimations for future information and interference signals corresponding to future data received signals. Therefore, the information signal has been essentially separated from the co-channel interference signal and can be demodulated with a lower bit error rate (BER) than previous demodulation techniques under these circumstances.

14 Claims, 9 Drawing Sheets

TDMA SINGLE ANTENNA CO-CHANNEL INTERFERENCE CANCELLATION

FIELD OF THE INVENTION

This invention relates to wireless communications, and more specifically, an improved demodulator for cancelling co-channel interference.

BACKGROUND OF THE INVENTION

In cellular communication systems, a demodulator is used at a receiver to extract data symbols such as 1-bits and 0-bits that are modulating a communications signal.

The function of a demodulator is complicated by the addition of additive white Gaussian noise (AWGN) and co-channel interference (CCI) to an information signal as it is transmitted through the flat-fading mobile-radio environment. AWGN is introduced from various background noise sources such as local physical media and electronic movement within communication devices. CCI is introduced when several communication channels in geographically close proximity to one another, using the same or closely spaced frequencies, begin to interfere with each other. It is a goal of the present invention to design a cost-effective and rapid demodulator that extracts modulating symbols from communication signals, notwithstanding the addition of a significant co-channel interference component to the signals as they travel through the mobile radio environment.

There are well known demodulation algorithms, such as the minimum mean square error (MMSE) solution, that allow for the cancellation of significant interference signals from a received signal as long as the number (N) of sources of CCI is less than the number (M) of antennas available to the demodulator. These algorithms are practical for base stations where there are typically a plurality of antennas, but are not for portable handsets and fixed wireless terminals where there is a limitation on physical space and cost. These portable handsets and fixed wireless terminals typically only have one antenna, making CCI cancellation (CCIC) by these known algorithms infeasible.

The nature of the problem can be clarified if the communications signal arriving at the input of a demodulator is analysed. More specifically, if one considers chopping up the signal along its time-axis into a plurality of segments that each correspond to one or a small number of symbols, such a segment, hereinafter the received signal, can be expressed in the following form, hereinafter referred to as equation (1):

$$r(n) = \alpha_d s_d(n) + \alpha_I s_I(n) + v(n)$$

The variable "n" is an index used to delineate the different received signals that comprise the communications signal received from the transmitter. "$S_d(n)$", hereinafter the information signal, is the part of the received signal that was modulated by one or more data symbols at the transmitter. Once the demodulator has determined the information signal, it can easily demodulate symbols from it. "$s_I(n)$", hereinafter the co-channel interference signal, is the part of the received signal that was transmitted at the same or closely spaced frequency as the information signal by a transmitter geographically in close proximity to the transmitter of the information signal. This interference signal is the information signal for a communication system that is geographically in close proximity, but is not desired within the received signal for the discussed communication system during demodulation. "$\alpha_d$" and "$\alpha_I$" are fading coefficients used to model the diminishing or enhancing of the information and interference radio channels respectively caused by changes in physical distances or structures between the transmitter and receiver. These fading coefficients are normally assumed to have a constant value over short periods of time, the duration of the periods being a function of the mobile speed. "v(n)" is the part of the received signal caused by the effects of AWGN, hereinafter the noise signal. The problem can thus be described as isolating the information signal from within the received signal, given that the information signal, interference signal, and the noise signal are unknown.

The solution to the problem is made easier because, assuming a digital modulation scheme is in use, a demodulator always has partial knowledge of the information signal. This knowledge is that the information signal can only be one of $x^N$ possible signals, where x is the number of symbols modulating each information signal, and N is the number of symbols supported by the modulation scheme in use. For example, if a π/4-DQPSK (differential quadrature phase shift keying) modulation scheme is in use, the information signal carrying a single symbol would have the following form:

$$s_d(n) = s_d(n-1) e^{j\pi B/4},$$

where B=1,3,5 or 7

In this example, the information signal would have to be one of only four possible signals.

This narrowing of the solution set for the information signal, is important because it allows demodulators to take advantage of cross-correlation detection techniques. These techniques are centred around a method of detecting signals in which the received signal is compared, point to point, with a reference signal that is an estimate of what the received signal should be if modulated by a given symbol. The output of such a detector is a measure of the degree of similarity between the received signal and the reference signal. Demodulators can take advantage of these techniques, by setting the reference signals of a cross-correlation detector to equal each of the $x^N$ possible information signals that could be within the received signal, and then selecting the reference signal that most closely correlates with the received signal as an estimate of the information signal.

Such cross-correlation detection techniques that ignore the interference and noise signals require that $\alpha_d$ be greater than $\alpha_I$ by more than 6 dB and that AWGN not be significant for the results to be within the acceptable reliable range, that being a bit error rate (BER) of less than 2%. If the two fading coefficients are within 6 dB or the AWGN is significant, the differences between a reference signal and a received signal could be just as easily attributable to the effects of CCI, as to differences between the underlying modulating symbols of the signals. Two signals that seem well-correlated may in fact only seem that way due to CCI effects and likewise, two signals that are in fact modulated by the same symbol may be poorly correlated with each other due to CCI effects. The fading coefficients do change over time and just because the average fading coefficients have more than 6 dB of separation does not guarantee that they have such separation for all time periods.

Therefore, in order to function in an environment that is heavily affected by CCI, it is desirable that demodulators that use cross-correlation detection techniques, hereinafter referred to as correlation demodulators, be able to distinguish between differences between received and reference signals that are attributable to CCI, and those that are attributable to their differing underlying modulating symbols. Conventional correlation demodulators, which simply cross-correlate each received signal with all possible reference signals, are unable to make this distinction, and thus select many incorrect reference signals as estimates of information signals when operating in the mobile radio environment.

Some existing correlation demodulators do try to model the effects of AWGN and CCI by making use of history correlation data. History correlation data is a record of the received signals and information signal estimates that have been previously made by the demodulator. An example of such a demodulator is disclosed in U.S. patent application Ser. No. 08/989,265 filed Dec. 11, 1997 by Cui et al and assigned to the assignee of the present application, which describes a correlation demodulator with maximal correlation symbol estimation (MCSE) that uses a weighted average of correlations between previously estimated information signals and their corresponding received signals to select as an estimate of the information signal the reference signal that most closely correlates with the received signal. This demodulator makes use of history correlation data to more accurately demodulate received signals conforming with any digital modulation scheme.

This MCSE demodulator treats CCI as simply another noise source, like AWGN, which must be eliminated. Knowledge of the modulation scheme for the information signal and the interference signal is not considered to aid in this elimination.

Correlation demodulators do exist that consider the modulation scheme of the information signal and use history correlation data to attempt to compensate for the effect of noise which influences the modulation of the received signals. For example, an article entitled "Data-aided Non-coherent Demodulation of DPSK" in IEEE Transactions On Communications, Vol. 43, No. 2/3/4, February/March/April 1995, describes a differential phase shift keying (DPSK) demodulator that makes use of history correlation data to take into account a random phase shift introduced by the channel.

This demodulator, similar to the MCSE demodulator, does not recognize the difference between the effects of CCI and the effects of AWGN on the received signal. It adjusts for a phase shift assumed to be relatively constant over time that is introduced by both CCI and AWGN, and is determined and adjusted using history correlation data. Neither of the above described demodulators fully cancel the co-channel interference component of the received signal. They compensate for estimates of the noise component in the received signal, but do not consider the unique properties of CCI and the source of the interference, or the changing fading coefficients in the compensation. This restricts the accuracy capable of being achieved in the estimate of the information signal using correlation demodulation with history correlation data.

A correlation demodulator is thus needed that can accurately estimate the interference signal along with the fading coefficients in order to allow full cancellation of the CCI from the received signals. Such a demodulator needs to refresh the estimates of the interference signal and the fading coefficients periodically to maintain their accuracy and therefore the accuracy of the demodulated information signal.

SUMMARY OF THE INVENTION

It is an object of the present invention to overcome the disadvantage of the prior art and, in particular, to provide a technique whereby a demodulator is capable of reducing co-channel interference from received TDMA signals.

According to a first aspect, the present invention provides in a demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, a method of reducing interference during demodulation comprising the steps of: inputting to the processor, during the training period, a plurality of training received signals and a plurality of known information signals that correspond to the training received signals; estimating an information fading coefficient by processing the training received signals and the known information signals and deriving estimates of a plurality of information components corresponding to the training received signals; estimating a plurality of interference components corresponding to the training received signals by processing the training received signals and the estimates of the information components; inputting to the processor, during the data period, a first received signal; and correlating the first received signal with the estimates of the information and interference components to generate an estimate of a first information signal corresponding to the first received signal.

According to a second aspect, the present invention provides a demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, the demodulator comprising: an estimation stage for generating an estimation of an information fading coefficient upon receipt of a plurality of training received signals and a corresponding plurality of known information signals during the training period; an interference demodulation stage for generating estimations of a plurality of interference components corresponding to the training received signals upon receipt of the training received signals and estimations of a plurality of corresponding information components comprising the estimation of the information fading coefficient and the known information signals; and a correlation stage for generating an estimation of a first information signal corresponding to a first received signal by correlating the first received signal with the estimations of the information and interference components.

According to a third aspect, the present invention provides a receiver coupled to a single antenna comprising: a gain controller coupled to the antenna, that amplifies the signals input from the antenna; an analog to digital converter coupled to the gain controller that converts the output from the gain controller into digital format; a receiver filter coupled to the analog to digital converter that generates a series of received signals within a time division multiple access (TDMA) time slot, each received signal comprising an information component and an interference component, both components comprising a signal and a fading coefficient, the TDMA time slot comprising a training period when the information signals are known at the processor and a data period when the information signals are not known; a demodulator that takes as input the series of received signals comprising: an estimation stage for generating an estimation of an information fading coefficient upon receipt of a plurality of training received signals and a corresponding plurality of known information signals during the training period; an interference demodulation stage for generating estimations of a plurality of interference components corresponding to the training received signals upon receipt of the training received signals and estimations of a plurality of corresponding information components comprising the estimation of the information fading coefficient and the known information signals; and a correlation stage for generating an estimation of a first information signal corresponding to a first received signal by correlating the first received signal with the estimations of the information and interference components.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
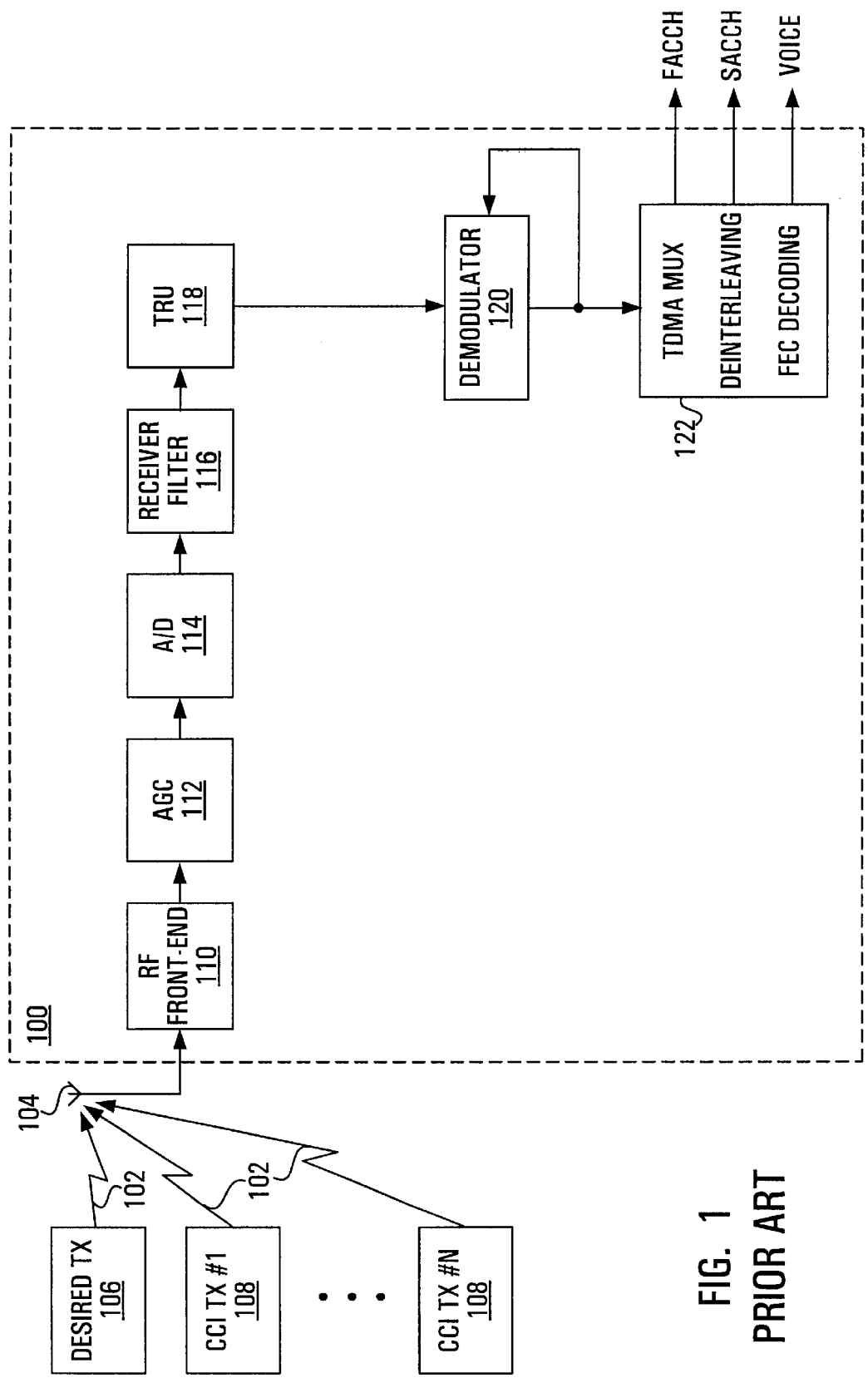
FIG. 1 is a high-level block diagram of a conventional time division multiple access (TDMA) receiver with a single antenna.

FIG. 1 illustrates a simplified block diagram of a wireless communications receiver 100 for receiving time-division multiple access (TDMA) radio waves 102 at a single antenna 104. It is typical that portable handsets, fixed wireless terminals, and other low-cost receivers employ only a single antenna 104 receiver system. Typically base-stations have a plurality of antennas 104 and therefore require a more complex receiver. Since an antenna 104 is tuned to receive a particular frequency or frequency range, the radio waves 102 received at the antenna 104 are transmitted either by a transmitter 106 sending a desired signal at that frequency or by a transmitter 108 sending an undesired signal at or near that frequency, therefore generating co-channel interference.

The antenna 104 leads into the following sequence of standard circuit blocks—a radio-frequency (RF) front-end 110, connected to an automatic gain controller (AGC) 112, connected to an analog to digital (A/D) converter 114, connected to a receiver filter 116, and further connected to a timing recovery unit (TRU) module 118. The combined effect of these blocks is to generate an incoherently matched digital received signal that is ready to be demodulated. This signal would still be corrupted by some AWGN effects and CCI effects if sent through a mobile radio environment. The signal is input to a correlation demodulator 120, which outputs a stream of symbols. The resultant symbol stream is passed to a TDMA demultiplexor 122 which subdivides the stream for delivery to end-users.

If one chops up the signal at the input of the demodulator 120 along its time-axis, into a plurality of segments that are each modulated by one or a small number of symbols, such a segment, hereinafter the received signal, can be expressed in the form of equation (1) described above, ie:

$$r(n)=\alpha_d s_d(n)+\alpha_I s_I(n)+v(n)$$

The most important intermediate output of a demodulator is the information decision signal $\hat{s}_d(n)$. It is an estimate made by the demodulator 120 of the information signal that is within a received signal. Assuming the received signal is a digitally modulated signal, such a digital signal being modulated by a scheme that recognizes a finite number of symbols, the demodulator 120 always has partial knowledge of the information signal.

Figure 2:
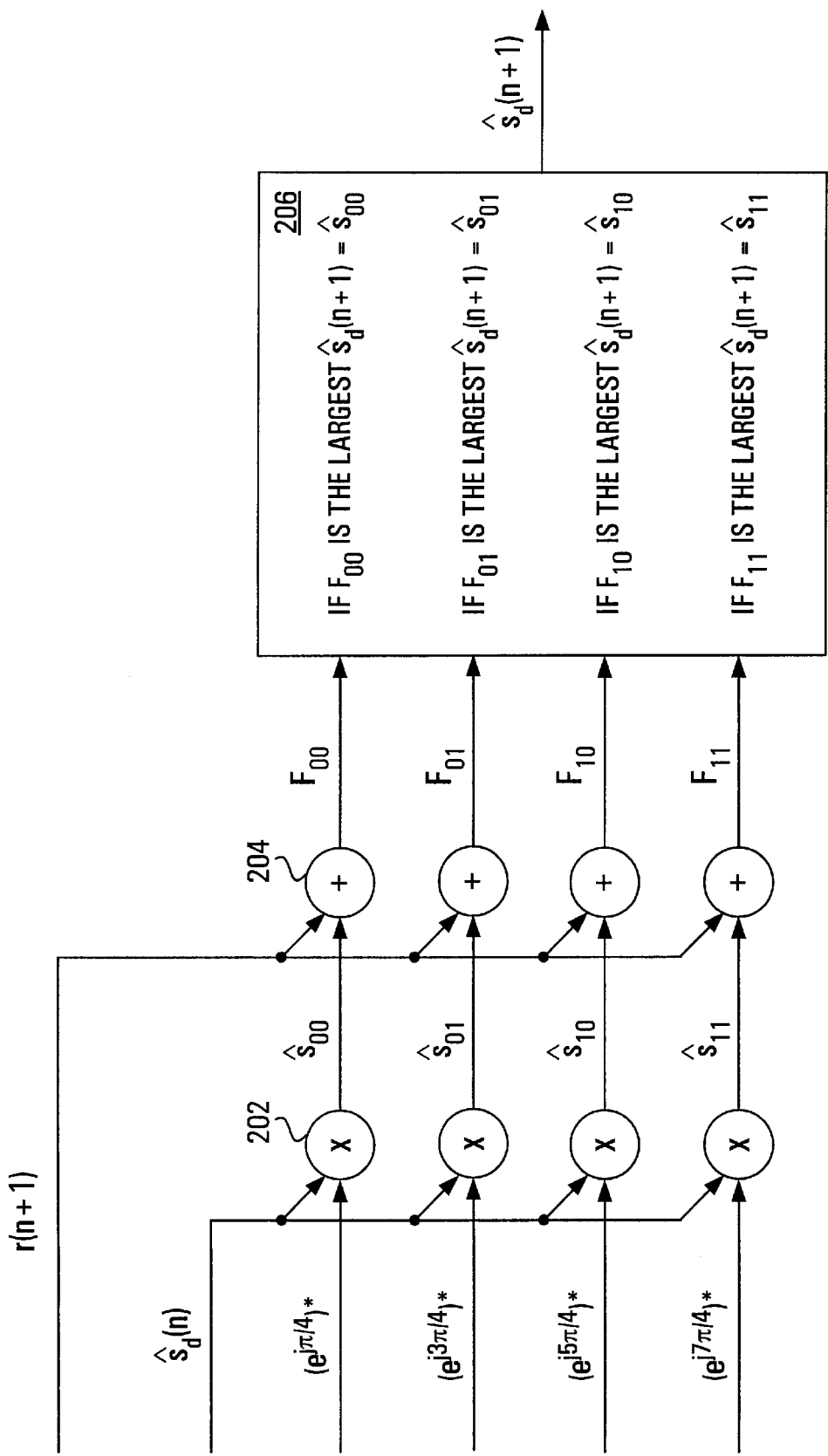
FIG. 2 illustrates a conventional demodulator for use in the receiver of FIG. 1.

Conventional demodulators use this partial knowledge in conjunction with correlation detection techniques, to extract information signals from received signals. FIG. 2 is a conceptual illustration of a correlation demodulator that is of conventional design, and that demodulates signals conforming with the π/4-DQPSK modulation scheme. The conventional demodulator is comprised of a battery of multipliers 202 connected to a battery of adders 204 connected to a decision device 206. The demodulator generates the four possible reference signals under this modulation scheme, by multiplying the decision signal associated with the previous received signal, $\hat{s}_d(n)$, with the four possible phase shifting signals supported by the π/4-DQPSK scheme, using the battery of multipliers 202. Since the magnitude of the four resulting reference signals, $\hat{s}_{00}$ $\hat{s}_{01}$, $\hat{s}_{11}$, $\hat{s}_{10}$ will be equal to one another, correlation with the received signal can be achieved by simply adding each reference signal to the current received signal r(n+1). This is accomplished by the battery of adders 204. The adders 204 yield four decision variables as output, $F_{00}$, $F_{01}$, $F_{11}$ and $F_{10}$. The largest decision variable, which is selected by the decision device 206, will be associated with the reference signal that correlates most closely with the received signal. That reference signal will be deemed the decision signal for the present iteration, $\hat{s}_d(n+1)$, and can be easily decoded to yield symbols.

The problem with the conventional demodulator of FIG. 2 is that it does not attempt to discover to what extent correlations between reference signals and the received signal are being determined by the interference signal component of the received signal. This information is vital since correlations that are significantly based on interference signal components are poor indicators of what information signal lies within a received signal.

Figure 3:
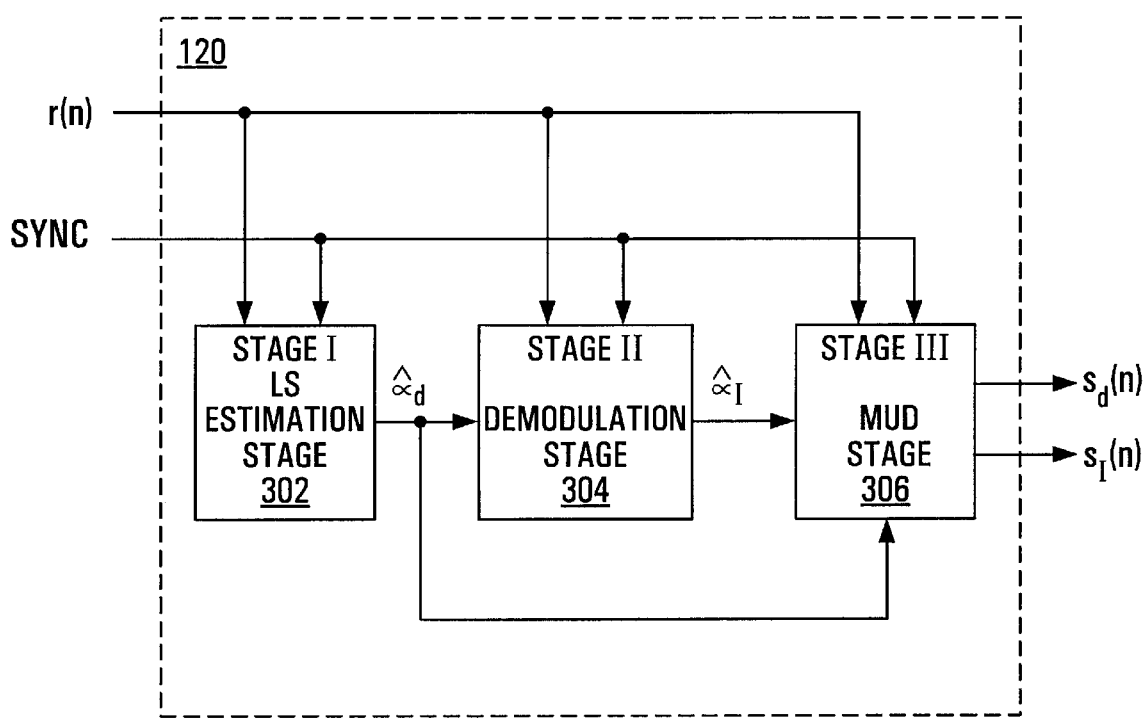
FIG. 3 is a simplified illustration of a single antenna co-channel interference cancellation (SA-CCIC) demodulator for use in the receiver of FIG. 1 as contemplated by the present invention.

FIG. 3 illustrates a simplified block diagram of a single antenna co-channel interference cancellation (SA-CCIC) demodulator 120 as contemplated by the present invention, which replaces in FIG. 1, the demodulator of FIG. 2. Such a demodulator can be fully implemented within a digital signal processing (DSP) apparatus. The preferred embodiment of the demodulator 120 contemplated by the present invention is part of a time division multiple access (TDMA) system with a π/4-DQPSK modulation scheme. In a TDMA system, a single channel is divided up in time into multiple time slots, each time slot capable of transmitting a half duplex data or voice communication. The bandwidth for the channel and the number of time slots can vary depending on the application.

Figure 4:
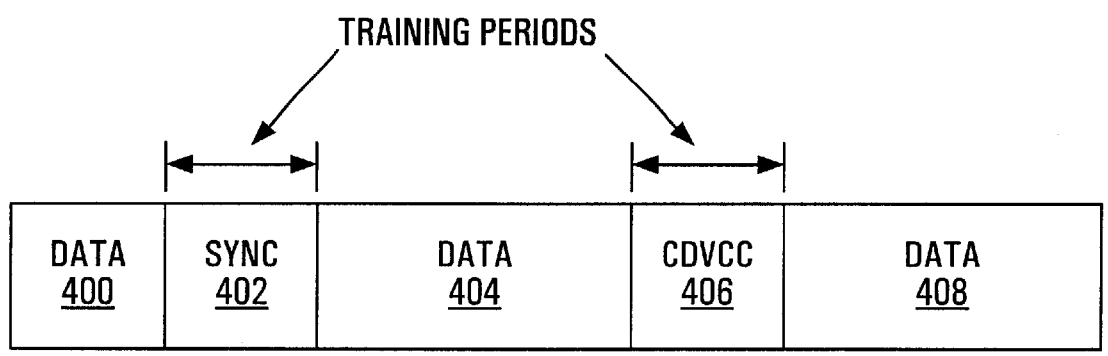
FIG. 4 illustrates a typical TDMA slot structure.

FIG. 4 illustrates a typical TDMA time slot structure which is comprised of a first data period 400 followed by a first training period 402, a second data period 404, a second training period 406, and a third data period 408. The first training period 402 typically consists of a preamble stage used for timing recovery and a 12 symbol SYNC word used for frame synchronization recovery. During this first training period 402, the information signals are known at the receiver 100 since the transmitter 106 is sending the known SYNC symbols as the information signals.

Referring now to FIG. 3, a least square (LS) estimation stage 302 uses, during the first training period 402, the known SYNC word along with the corresponding series of received signals to estimate the coinciding information fading coefficient $\hat{\alpha}_d$. A demodulation stage 304 then proceeds to estimate a series of interference signals corresponding to the received signals and an estimation of the interference fading coefficient $\hat{\alpha}_I$ corresponding to the series of interference signals. These estimates are used, during the second data period 404, by a multi user detector (MUD) stage 306 to aid in the demodulation of the information signals being transmitted. With the use of a slide window, the estimations of the fading coefficients are periodically regenerated to maintain accuracy during the second data period 404. A slide window corresponds to the sample set of received signals that are used for the regeneration of the estimates.

The second training period 406 for a typical TDMA communication system is during the transmission of a 12 symbol coded digital verification color code (CDVCC) word which is used to transfer attributes associated with the information that is being transmitted. These attributes are used to ensure that the correct data is being decoded rather than co-channel information. In the preferred embodiment, the SA-CCIC demodulator 120 uses this second training period 406 to re-estimate the fading coefficients, using the LS estimation stage 302 and the demodulation stage 304, in order to increase the accuracy during the third data period 408.

An additional aspect of the present invention is the saving of received signals directly prior to the training periods 402,406. After the re-estimating of the fading coefficients, the received signals within memory are demodulated with increased accuracy as is described in detail later. This additional aspect can be used to demodulate the information within the first data period 400.

A detailed description of the SA-CCIC demodulator 120 as contemplated by the present invention is now described with reference to FIG. 5. This demodulator 120 samples a plurality of received signals during sample periods of length L. Each plurality of received signals is represented by the following equation in block matrix form.

$$R=\alpha_d S_d + \alpha_I S_I + V$$

where $$R=[r(n-L+1)r(n-L+2)\ldots r(n)]^T$$
$$S_d=[s_d(n-L+1)s_d(n-L+2)\ldots s_d(n)]^T$$
$$S_I=[s_I(n-L+1)s_I(n-L+2)\ldots s_I(n)]^T$$
$$V=[v(n-L+1)v(n-L+2)\ldots v(n)]^T$$

During the first training period 402, the length L of the sample period is chosen to be the length of the SYNC word.

Figure 5:
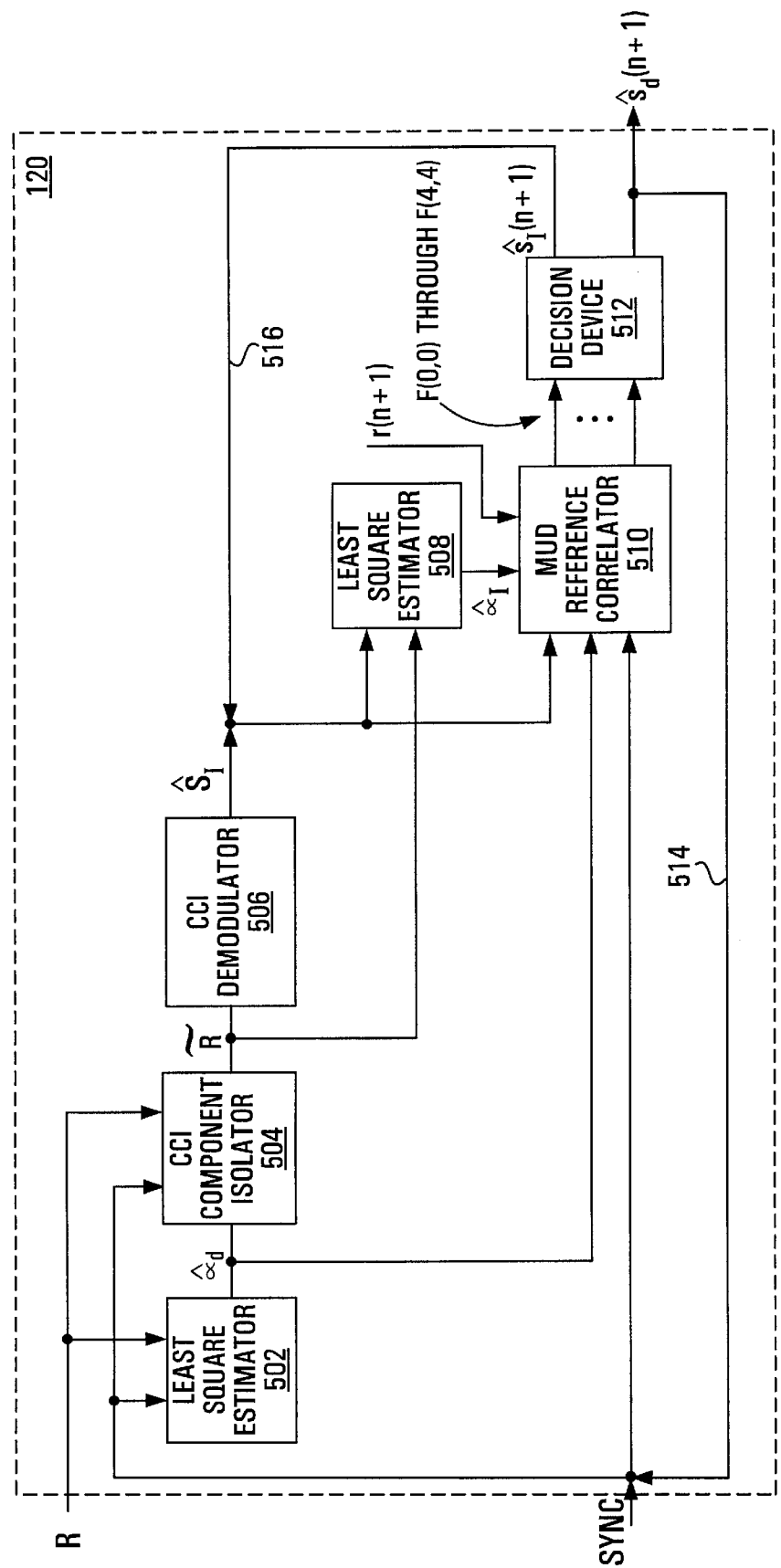
FIG. 5 is a detailed block diagram of the SA-CCIC demodulator of FIG. 3.

Inside the demodulator 120 of FIG. 5 is a first least square estimator 502, which receives from the timing recovery unit 118, during the initial training period 402, both the matrix of received signals R and the SYNC word that corresponds to the matrix $S_d$ of transmitted known information signals. This first least square estimator 502 generates an estimate for the information fading coefficient $\hat{\alpha}_d$ through the use of the following well understood least square solution formula.

$$\hat{\alpha}_d = RS_d'[S_d S_d']^{-1}$$

The fading coefficient $\hat{\alpha}_d$ for the information signal is then input, along with the SYNC word and the matrix R of received signals from the TRU 118, to a co-channel interference component isolator 504.

The CCI component isolator 504 uses the matrix $S_d$ of known information signals, that being the SYNC word, along with the estimated fading coefficient $\hat{\alpha}_d$ of the information signal in order to generate a series of non-information received signals $\tilde{r}(n)$ which each represent the component of a received signal $r(n)$ that is completely due to the CCI component $\hat{\alpha}_I s_I(n)$ and the noise signal $v(n)$. For situations where the radio channel does not add a significant AWGN component to the received signal $r(n)$, this non-information received signal $\tilde{r}(n)$ is a good estimate of the CCI component $\hat{\alpha}_I s_I(n)$. This isolation of the CCI component $\hat{\alpha}_I s_I(n)$ is done with the following formula in block matrix form which can be implemented within a standard digital signal processing (DSP) apparatus.

$$\tilde{R}=R-\hat{\alpha}_d S_d \approx \alpha_I S_I$$

where $$\tilde{R}=[\tilde{r}(n-L+1)\tilde{r}(n-L+2)\ldots \tilde{r}(n)]^T$$

The estimates for the CCI component $\hat{\alpha}_I s_I(n)$ of the received signals $r(n)$ generated with the above formula are input into a CCI demodulator 506.

The CCI demodulator 506 is a well understood conventional differential demodulator for a $\pi/4$-DQPSK modulation scheme as illustrated in FIG. 2. The CCI demodulator 506 generates a series of interference decision signals $\hat{s}_I(n)$ which are estimates made by the CCI demodulator 506 of the information component in the co-channel interference signals. The series of interference decision signals $\hat{s}_I(n)$ are then input, in matrix form $\hat{S}_I$, along with the matrix $\tilde{R}$ of non-information received signals to a second least square estimator 508 to generate an estimate of the interference fading coefficient $\hat{\alpha}_I$ with use of the following well understood least square solution formula.

$$\hat{\alpha}_I = \tilde{R} \hat{S}_I'[\hat{S}_I \hat{S}_I']^{-1}$$

This second least square estimator can possibly be of the same apparatus as the first least square estimator with different input variables. This estimation of the interference fading coefficient $\hat{\alpha}_I$ completes the necessary estimations that must occur prior to the start of the demodulation of received signals within the second data period 404.

Once the training period 402 is complete, the final known information signal $S_d(n)$ of the SYNC word, the final estimate of the interference signal $\tilde{s}(n)$ coinciding with that final known information signal $s_d(n)$, and the estimates for the fading coefficients $\hat{\alpha}_d$ and $\hat{\alpha}_I$ are input, along with a new received signal $r(n+1)$, to a multi user detector (MUD)

reference correlator 510. This correlator 510 generates a series of 16 outputs using the following formula that can be implemented using a standard DSP apparatus.

$$F(i, k) = \left| r(n+1) - \hat{\alpha}_d s_d(n) e^{j\frac{\pi}{4}b(i)} - \hat{\alpha}_I \hat{s}_I(n) e^{j\frac{\pi}{4}b(k)} \right|$$

where i=1,2,3,4; b(i)=1,3,5,7;

k=1,2,3,4; b(k)=1,3,5,7

The 16 outputs of the correlator 510, hereinafter the decision variables, represent all possible combinations for variables i and k in the above formula, which in turn embody all possible phases of a new information signal $s_d$(n+1) and a new interference signal $s_I$(n+1) within the new received signal r(n+1). Amongst the different decision variables, the magnitude of each information signal component $$\hat{\alpha}_d s_d(n) e^{j\frac{\pi}{4}b(i)}$$

is identical to that of the other information signal components. Similarly, the magnitudes of each interference signal component $$\hat{\alpha}_I \hat{s}_I(n) e^{j\frac{\pi}{4}b(k)}$$

are the same. The subtraction of the information and interference signal components from the new received signal r(n+1) results in varied magnitudes for the decision variables depending on their relative correlation with the new received signal r(n+1).

The 16 decision variables are input to a decision device 512 which outputs an information decision signal $\hat{s}_d$(n+1) and an interference decision signal $\hat{\alpha}_I$(n+1). To determine the information decision signal $\hat{s}_d$(n+1) and the interference decision signal $\hat{s}_I$(n+1) the decision variables are all independently squared and the smallest result is found. The values of variables i and k corresponding to this smallest result are used in the following easily implemented formulae to determine the decision signals.

$$\hat{s}_d(n+1) = s_d(n) e^{j\frac{\pi}{4}b(i)}$$

$$\hat{s}_I(n+1) = \hat{s}_I(n) e^{j\frac{\pi}{4}b(k)}$$

The information decision signal $\hat{s}_d$(n+1) can thereafter be easily decoded to provide a stream of symbols as output to the demodulator.

The MUD reference correlator 510 and the decision device 512 continue the above procedure of determining information and interference decision signals for additional received signals. In these determinations, the same information signal components $$\hat{\alpha}_d s_d(n) e^{j\frac{\pi}{4}b(i)}$$

and interference signal components $$\hat{\alpha}_I \hat{s}_I(n) e^{j\frac{\pi}{4}b(k)}$$

are used to calculate the new decision variables and hence the new decision signals. This process continues for received signals r(n+2) to r(n+N/2), where N represents the length of a slide window. At this point, new matrices $\hat{S}_d$ and $\hat{S}_I$ are generated of the information and interference decision signals corresponding to the slide window set of received signals r(n−N/2+1) to r(n+N/2). As well, a new matrix R of these received signals is generated.

This new matrix $\hat{S}_d$ of information decision signals is fed back into the first least square estimator 502 and the CCI component isolator 504 via line 514. The matrix $\hat{S}_d$ of information decision signals replaces the matrix of the known information signals corresponding to the SYNC word and the matrix R of the slide window set of received signals replaces the previous matrix R of received signals within these blocks. With these new inputs, the first least square estimator 502 generates a new estimate for the information fading coefficient $\hat{\alpha}_d$ as described above, which is subsequently input to the CCI component isolator 504. The CCI component isolator 504, now with all new inputs, generates a new matrix $\tilde{R}$ of non-information received signals in a similar fashion as described above.

The new matrix $\hat{S}_I$ of interference decision signals is fed back into the second least square estimator 508 via line 516, which replaces the original matrix of interference decision signals generated by the CCI demodulator 506. The CCI demodulator 506 is not used during the data periods 400, 404,408 since the decision procedure within the decision device 512 provides a sufficient estimation of the interference signals. The second least square estimator now has inputs of the new matrix $\hat{S}_I$ of interference decision signals along with the new matrix $\tilde{R}$ of non-information received signals and generates a new estimate for the interference fading coefficient $\hat{\alpha}_I$.

Subsequently, the new estimates of the fading coefficients $\hat{\alpha}_d$ and $\hat{\alpha}_I$ and the final information decision signal $\hat{s}_d$(n+N/2) and interference decision signal $\hat{S}_I$(n+N/2) for the slide window are input to the MUD reference correlator 510 and are used along with the decision device to generate new information and interference decision signals which correspond to the series of received signals within the next slide window.

This re-estimating of the fading coefficients $\hat{\alpha}_d$ and $\hat{\alpha}_I$ for every slide window continues for the demodulator 120 contemplated by the present invention until the second training period 406 starts. During this second training period 406, the estimates for the fading coefficients $\hat{\alpha}_d$ and $\hat{\alpha}_I$ are regenerated, in similar fashion to the procedure conducted for the first training period, using the known information signals representing the CDVCC word along with the corresponding set of received signals within the second training period.

As the number of received signals after the first training period 402 increases, the accuracy of the estimations for the decision signals decrease due to the only periodic re-estimations of the fading coefficients and the iterative nature of these estimations. In other words, as the number of iterations increases, the probability of error in each iteration also increases. The recurrent training period nature of TDMA systems allows for the demodulator 120 contemplated by the present invention to maintain acceptable bit error rates (BER) over extended periods of communication.

One embodiment of the present invention has a sufficient amount of memory to save a predetermined number of received signals being received by the demodulator 120 directly prior to a scheduled training period 402,406. After the reception of the known information signals during the training period 402,406 and the subsequent regeneration of high quality estimations for the fading coefficients $\hat{\alpha}_d$ and $\hat{\alpha}_I$, the demodulator retrieves the predetermined number of received signals from memory and demodulates them in reverse order starting with the most recently received signal r(n−1) and proceeding through the remainder of the saved received signals r(n−2) to r(n−M) where "M" represents the number of predetermined received signals saved to memory. This process may be used to demodulate the received signals during the first data period 400, starting with the received signal directly previous to the first training period 402.

The preferred embodiment of the present invention is designed for the case of a single dominant co-channel interference source with other CCI sources and AWGN being insignificant. A CCI source is determined to be insignificant if the interference fading factor $\hat{\alpha}_I$ is found to be 6 dB below the information fading factor $\hat{\alpha}_d$. In the case of a plurality of CCI sources, the received signal can be expressed in the following form:

$$r(n) = \hat{\alpha}_d s_d(n) + \sum_{i=1}^{N_o} \alpha_i s_i(n) + v(n)$$

In the case of a plurality of CCI sources, the SA-CCIC demodulator 120 of FIG. 5 treats the plurality of CCI sources as a singular CCI source throughout the equations disclosed above. Hence, the interference decision signal $\hat{s}_I(n)$ and the interference fading factor $\hat{\alpha}_I$ estimated in the demodulation algorithm are in actuality estimations for the combined interference component of the received signal. In the case that the primary CCI source is not a TDMA transmitter, but an advanced mobile phone system (AMPS) transmitter, the SA-CCIC demodulator 120 operates in similar fashion as disclosed above except in actuality the interference decision signal $\hat{s}_I(n)$ will simply be an estimation of the phase shift component for the AMPS signal and will not accurately portray the true interference signal $s_I(n)$.

A test simulator to calculate the bit error rates (BER) of π/4-DQPSK demodulators in TDMA communication systems with various types and quantities of interference and noise sources is now described with reference to FIG. 6. This simulator includes a TDMA data slot generator 602 to create a series of symbols to be input to the TDMA system, a π/4-DQPSK modulator 604 to modulate the series of symbols, a fading generator 606 to add a random fading coefficient to the modulated information signal, and a summation block 608 to add a user defined type and quantity of co-channel interference and AWGN sources to the output from the fading generator 606. The output from the summation block 608, hereinafter referred to as the test received signal, is input to the demodulator under test 610 and the output information symbols of the demodulator 610 are analysed by the data analysis block 612. In this data analysis block 612, the output symbols generated by the demodulator under test 610 are compared to the series of symbols generated by the TDMA data slot generator 602 to calculate a BER for the demodulator 610 under the set test conditions.

Figure 6:
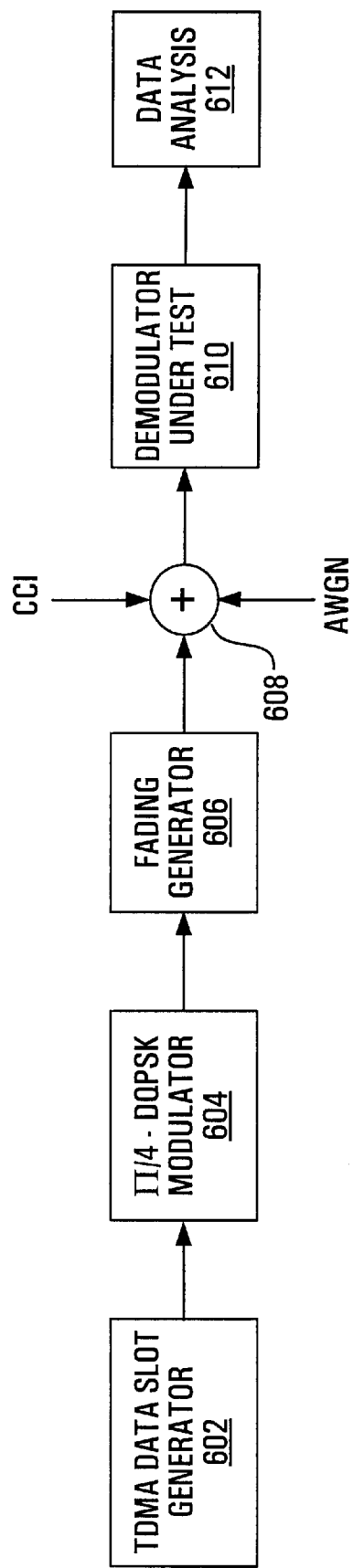
FIG. 6 is a block diagram of a simulation apparatus used to test the reliability of a demodulator.

The SA-CCIC demodulator 120 contemplated by the present invention of FIG. 5 completed performance evaluations under the test simulator of FIG. 6 with various types and quantities of interference and noise, along with various Doppler frequencies. A Doppler frequency is a measurement of the rate of change for the information fading coefficient $\hat{\alpha}_d$ over a set period of time and indicates the separation speed for the receiver 100 with respect to the desired transmitter 106. The evaluations were conducted for the cases of the addition of 1 TDMA CCI source, 2 TDMA CCI sources, 3 TDMA CCI sources, 1 advanced mobile phone system (AMPS) CCI source, and an AWGN source. In the above cases of multiple CCI sources, the relative power levels among the interference signals affect the performance of the demodulator, but in the presently described performance evaluations only the equal power scenario was considered for simplicity. This means that only the worst case for the SA-CCIC demodulator 120 of all CCI sources having the same power level was contemplated. Hence, this can be used as a benchmark for the unequal scenarios. For each of the above cases, the Doppler frequency was adjusted between 2 Hz, which corresponds to a separation speed between the receiver 100 and the transmitter 106 of 2.5 km/h, and 78 Hz, which corresponds to a separation speed of 100 km/h.

Figure 7A:
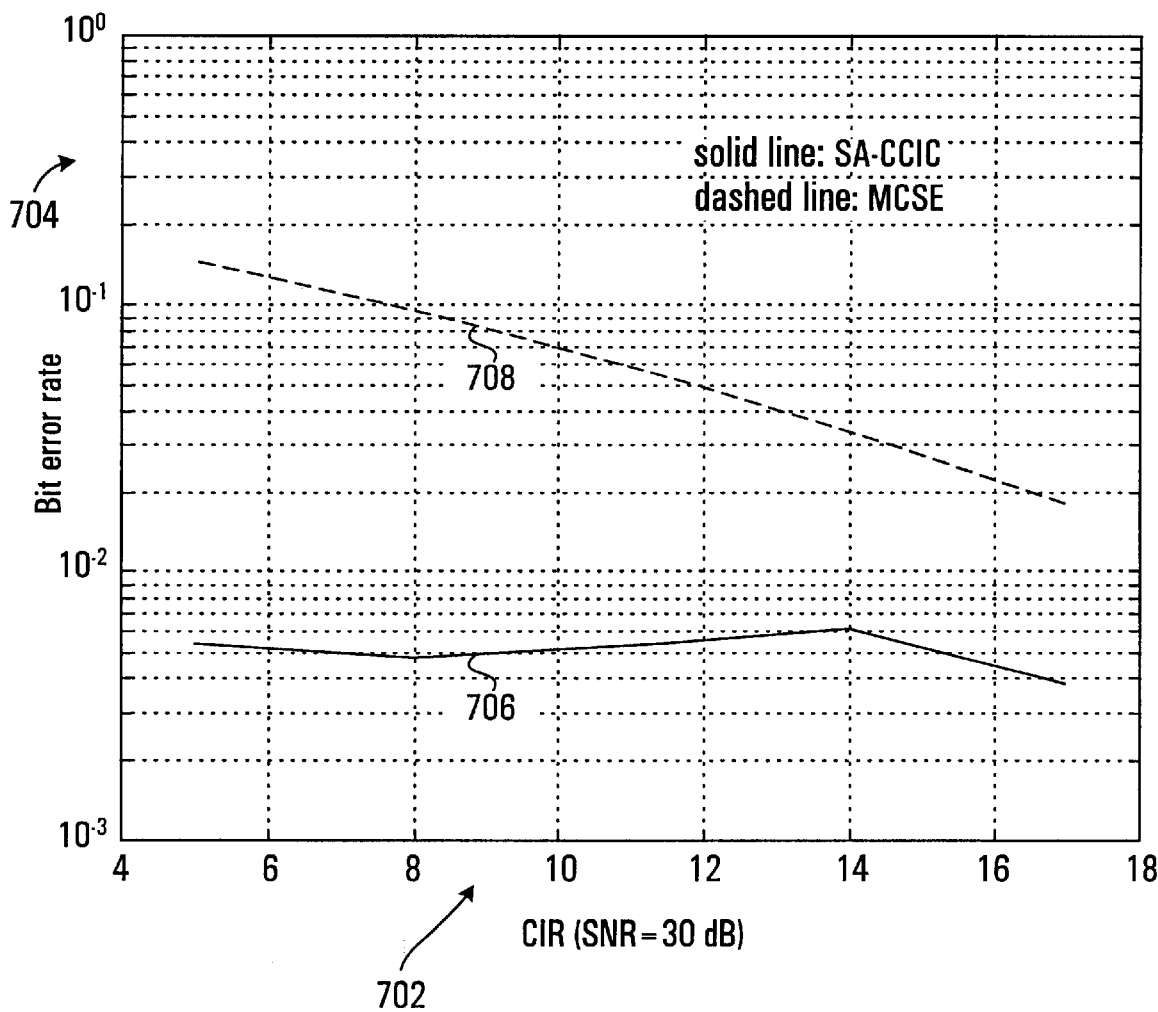
FIGS. 7a, 7b, and 7c illustrate plots that compare bit error rate (BER) levels exhibited by the SA-CCIC demodulator of FIG. 5 with the MCSE demodulator while functioning within the simulation apparatus of FIG. 6.
Figure 7B:
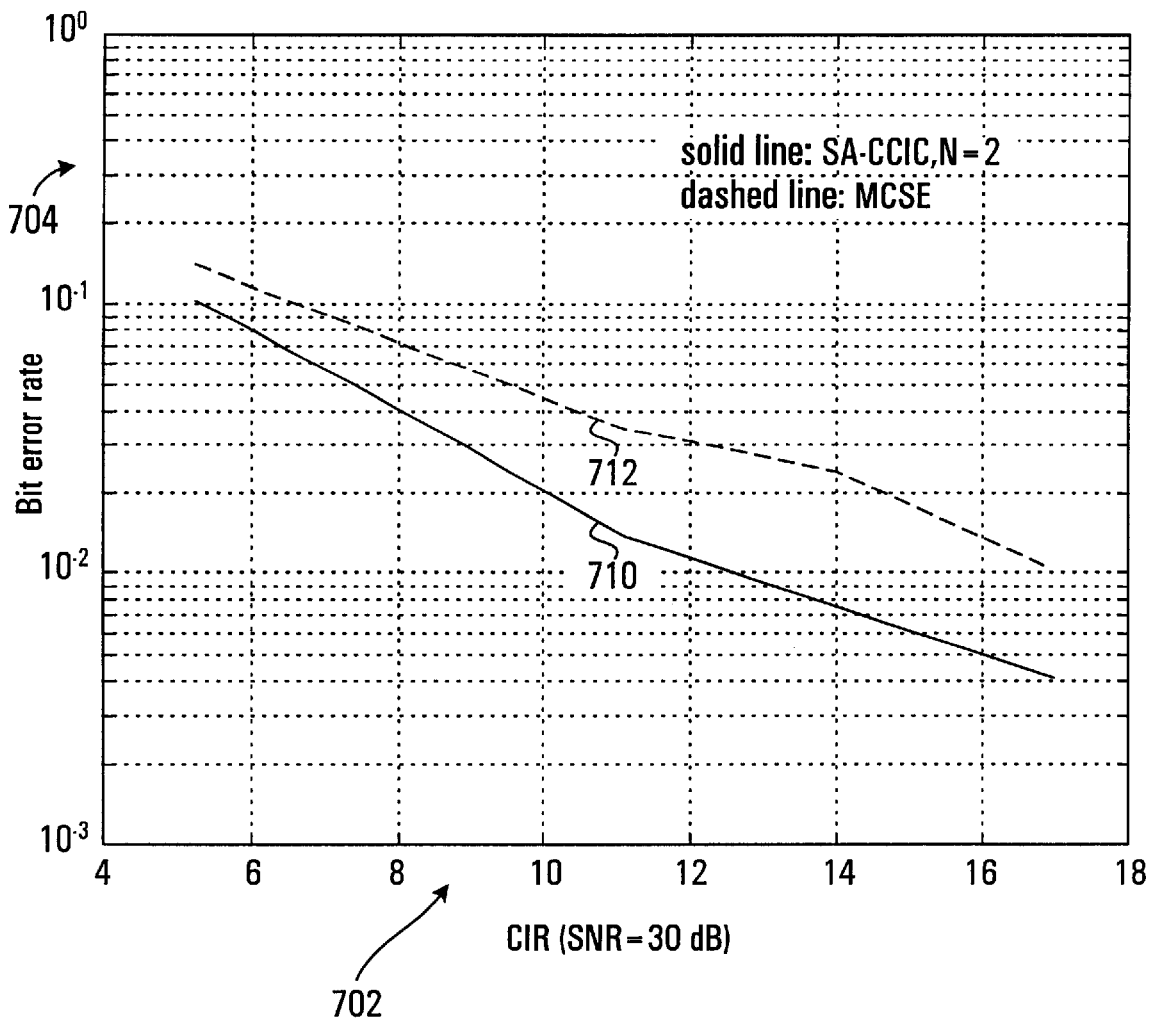
Figure 7C:
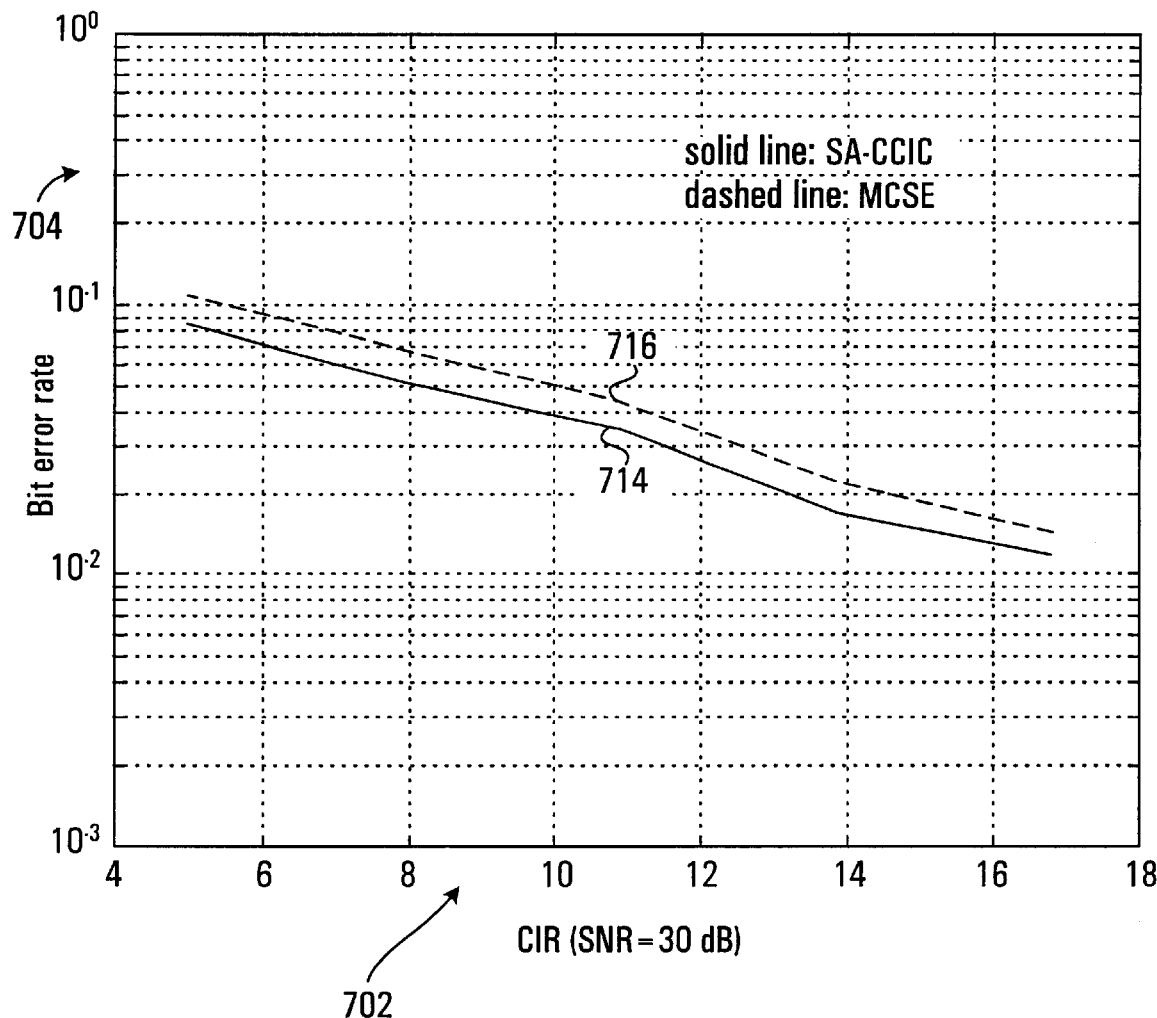

These evaluations were conducted in parallel with similar tests performed on the maximal correlation symbol estimation (MCSE) demodulator disclosed in the above mentioned U.S. patent application Ser. No. 08/989,265. Selected results from these series of tests are illustrated in the plots of FIGS. 7a, 7b, and 7c. The horizontal axis 702 in all three plots represents the carrier-to-interference rate (CIR) in dB for the simulated radio channel. The performance evaluation was conducted under a wide range of CIR from 5 to 17 dB. The vertical axis 704 in all three plots represents, on a logarithmic scale, the average bit error rate (BER) for the demodulator under test 610 with the particular conditions set for the evaluation.

The performance evaluations of the SA-CCIC demodulator 120 and the MCSE demodulator with 1 TDMA CCI source added to the simulated radio channel while the Doppler frequency was set at 2 Hz is depicted in FIG. 7a. This is the case that the SA-CCIC demodulator 120 was especially designed for, that being 1 CCI source and a low Doppler frequency. It can be seen from the plot in FIG. 7a that the performance line 706 for the SA-CCIC demodulator 120 is significantly improved for all CIR compared to the performance line 708 for the MCSE demodulator. Although not shown in the accompanying plots, it is noted that the SA-CCIC demodulator 120 was found to have better performance, with one exception, compared to the MCSE demodulator for both a Doppler frequency of 24 Hz and 78 Hz for all CIR when only 1 TDMA CCI source was introduced to the simulator. The exception was when the CIR was set at 17 dB and the Doppler frequency was at 78 Hz the MCSE demodulator had slightly better performance than the SA-CCIC demodulator 120.

FIG. 7b depicts the performance evaluations of the SA-CCIC demodulator 120 and the MCSE demodulator when 2 TDMA CCI sources are added to the simulated radio channel and the Doppler frequency is set to 2 Hz. It can be seen from this plot that the performance line 710 for the SA-CCIC demodulator 120 is improved for all CIR compared to the performance line 712 for the MCSE demodulator. It is also noted that the SA-CCIC demodulator 120 was found to have better performance compared to the MCSE demodulator for all CIR when the Doppler frequency was set to 24 Hz. When the Doppler frequency was set to 78 Hz, there was only marginal differences between the two demodulators with each performing better under certain CIR.

Although not shown in the accompanying plots, it is disclosed that the SA-CCIC demodulator 120 and the MCSE demodulator had marginal differences in performance when 3 TDMA CCI sources were introduced to the simulated radio channel. The SA-CCIC demodulator had slightly better performance for all CIR when the Doppler frequency was set at 2 Hz and 24 Hz, but had slightly worse performance when the Doppler frequency was set at 78 Hz.

The performance evaluations of the SA-CCIC demodulator 120 and the MCSE demodulator with 1 AMPS CCI source added to the simulated radio channel while the Doppler frequency was set at 2 Hz is depicted in FIG. 7c. It can be seen from this plot that the performance line 714 for the SA-CCIC demodulator 120 is slightly improved for all CIR compared to the performance line 716 for the MCSE demodulator. Although not shown in the accompanying plots, for a single AMPS CCI source it is noted that the SA-CCIC demodulator 120 was found to have slightly better performance at a Doppler frequency of 24 Hz, but slightly worse performance at a Doppler frequency of 78 Hz.

The SA-CCIC demodulator 120 was found to have virtually identical performance at a Doppler frequency of 2 Hz compared to the MCSE demodulator when AWGN was added to the simulated radio channel without the addition of any CCI. When the Doppler frequency is increased to 24 and 78 Hz, the SA-CCIC demodulator 120 has slightly worse performance than the MCSE demodulator.

One embodiment for the SA-CCIC demodulator as contemplated by the present invention allows for the re-estimation of the fading coefficients $\hat{\alpha}_d$ and $\hat{\alpha}_I$ after each generation of an information decision signal. This would be done with a rotating matrix in which the previous decision signals generated by the decision device are input to the decision signal matrices $\hat{S}_d$ and $\hat{S}_I$ with the decision signals corresponding to the most out of date received signal being removed from the matrices. This embodiment will result in a decrease in the average BER, but will also increase the complexity of the demodulation algorithm since the first and second least square estimators 502,508 and the CCI component isolator 504 are used for every received signal r(n).

Another embodiment of the present invention is the case that the estimations of the fading coefficients $\hat{\alpha}_d$ and $\hat{\alpha}_I$ and the interference signal $s_I(n)$ are only performed during the training periods 402,406 with an assumption that they do not change significantly between these periods. In this circumstance, there is no requirement to generate the interference decision signals at the decision device 512 since there is no stage of re-estimations outside of the training periods in which the CCI demodulator 506 is in operation. This decreases the complexity of the demodulator with a significant sacrifice in the accuracy. The preferred embodiment of the present invention described in detail above is a compromise between these last two extreme embodiments. The length of the slide window causes a tradeoff between complexity and accuracy.

Since it was found that the SA-CCIC demodulator 120 has superior performance in certain radio channel environments, the MCSE demodulator disclosed in the above mentioned U.S. patent application Ser. No. 08/989, 265 has improved performance in other environments, and the conventional demodulator, as depicted in FIG. 2, has advantages such as simplicity, it is contemplated that a combined demodulator incorporating at least two of these demodulation algorithms can gain overall better performance for all circumstances. The combined demodulator includes an SA-CCIC demodulator as contemplated by the present invention, an MCSE demodulator and/or a conventional demodulator, and a smart detector to switch between the demodulators depending upon the radio channel environment present at the time. The smart detector identifies an environment with limited CCI sources and switches the demodulation from the SA-CCIC demodulator to the MCSE or the conventional demodulator.

One embodiment of the contemplated combined demodulator comprises a SA-CCIC demodulator and a conventional demodulator, along with a signal to interference plus noise (SINR) smart detector. The SINR smart detector measures the SINR during one of the training periods by calculating the power of the desired signal with use of the information component estimations and calculating the power of the interference plus noise with use of the interference component estimations. If the determined SINR is greater than 6 dB, the conventional demodulator is used, wherein if it is found that the SINR is less than 6 dB, the SA-CCIC demodulator according to the present invention is used.

A further embodiment of the present invention is contemplated for the situation in which the information signal $s_d(n)$ is transmitted within a joint equalization environment. Within such an environment, a single information signal $s_d(n)$ is transmitted a plurality of times. The received signal r(n), for the situation that each information signal $s_d(n)$ is transmitted twice, can be expressed in the following form:

$$r(n) = \alpha_{d1}s_d(n) + \alpha_{d2}s_d(n-D) + \alpha_I s_I(n) + v(n)$$

The variable "D" represents the delay time between the first and second transmission of each information signal. "$s_d(n)$" and "$s_d(n-D)$" are respectively the first and second information signals within the single received signal r(n). "$\alpha_{d1}$" and "$\alpha_{d2}$" are fading coefficients used to model the diminishing or enhancing of the first and second information signals caused by changes in physical distances or structures between the transmitter and receiver.

The demodulation of a received signal r(n) within the joint equalization environment using the SA-CCIC demodulator 120 as contemplated by the present invention is similar to the demodulation of a typical received signal r(n) as analysed previously. As described above, the SA-CCIC demodulator 120 samples a plurality of received signals during sample periods of length L. In block matrix form, a plurality of received signals r(n) within the joint equalization environment are represented by the following formula:

$$R = \alpha_{d1}S_{d1} + \alpha_{d2}S_{d2} + \alpha_I S_I + V$$

where $$R = [r(n-L+1)r(n-L+2) \ldots r(n)]^T$$

$$S_{d1} = [s_d(n-L+1)s_d(n-L+2) \ldots s_d(n)]^T$$

$$S_{d2} = [s_d(n-D-L+1)s_d(n-D-L+2) \ldots s_d(n-D)]^T$$

$$S_I = [s_I(n-L+1)s_I(n-L+2) \ldots s_I(n)]^T$$

$$V = [v(n-L+1)v(n-L+2) \ldots v(n)]^T$$

During the first training period 402, the matrices $S_{d1}$ and $S_{d2}$ of first and second information signals are both known at the receiver 100. Using the previously described least square solution formula for both the first and second information signals $s_d(n)$ and $s_d(n-D)$, estimations of the respective fading coefficients $\hat{\alpha}_{d1}$ and $\hat{\alpha}_{d2}$ are determined.

Next, a matrix $\tilde{R}$ of non-information received signals is generated similar to that described above. This is done with the following formula in block matrix form which can be implemented within a CCI component isolator as described above.

$$\tilde{R}=R-\hat{\alpha}_{d1}S_{d1}-\hat{\alpha}_{d2}S_{d2}\approx\alpha_I S_I$$

The estimates for the CCI component $\hat{\alpha}_I\hat{s}_I(n)$ of the received signals r(n) generated with the above formula are input into a conventional differential demodulator.

Similar to the previously described procedure, the interference signals $s_I(n)$ are then estimated with use of the conventional demodulator and the interference fading coefficient $\hat{\alpha}_I$ is estimated with use of a least square estimator. As prior mentioned, the estimation of the interference fading coefficient $\hat{\alpha}_I$ completes the necessary estimations that must occur before the start of the demodulation of received signals within the second data period 404.

The earlier described correlator 510 functions in similar fashion to the correlator required within the SA-CCIC demodulator while in the joint equalization environment. The correlator within the joint equalization environment generates 64 outputs using the following formula.

$$F(h,i,k) = \left| r(n+1) - \hat{\alpha}_{d1}s_d(n)e^{j\frac{\pi}{4}b(h)} - \hat{\alpha}_{d2}s_d(n-D)e^{j\frac{\pi}{4}b(i)} - \hat{\alpha}_I\hat{s}_I(n)e^{j\frac{\pi}{4}b(k)} \right|$$

where h=1,2,3,4; b(h)=1,3,5,7;

i=1,2,3,4; b(i)=1,3,5,7;

k=1,2,3,4; b(k)=1,3,5,7

The 64 outputs of this correlator, those being the decision variables, are all possible combinations for variables h, i, and k in the above formula.

With use of a decision device similar to the decision device 512 described previously, the 64 decision variables are input, independently squared, and compared. The values of variables h, i, and k corresponding to the smallest result are used in the following formulae to determine the decision signals for the first and second information signals, and the interference signal.

$$\hat{s}_d(n+1) = s_d(n)e^{j\frac{\pi}{4}b(h)}$$

$$\hat{s}_d(n-D+1) = s_d(n-D)e^{j\frac{\pi}{4}b(i)}$$

$$\hat{s}_I(n+1) = s_I(n)e^{j\frac{\pi}{4}b(k)}$$

The first and second information decision signals $\hat{s}_d(n+1)$ and $\hat{s}_d(n-D+1)$ can thereafter be easily decoded to provide streams of symbols as outputs to the demodulator. The demodulation of the remaining received signals would continue as described above with use of the slightly modified embodiment of the present invention.

Persons skilled in the art will appreciate that there are other alternative implementations and modifications possible to use the above algorithm to cancel co-channel interference in a single antenna TDMA communication system, and that the above implementation is only an illustration of this embodiment of the invention. The scope of the invention, therefore, is only to be limited by the claims appended hereto.

What is claimed is:

1. In a demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, a method of reducing interference during demodulation comprising the steps of:

inputting to the processor, during the training period, a plurality of training received signals and a plurality of known information signals that correspond to the training received signals;

estimating an information fading coefficient by processing the training received signals and the known information signals and deriving estimates of a plurality of information components corresponding to the training received signals;

estimating a plurality of interference components corresponding to the training received signals by processing the training received signals and the estimates of the information components;

inputting to the processor, during the data period, a first received signal;

correlating the first received signal with the estimates of the information and interference components to generate an estimate of a first information signal corresponding to the first received signal;

wherein each information signal and interference signal within the series of received signals is modulated according to a given information modulation scheme and a given interference modulation scheme respectively;

wherein the generation of the estimate for the first information signal comprises;

correlating the estimate of one of the plurality of information components and all possible information reference signals, each information reference signal being one of the closed set of all possible information signals recognized by the given information digital modulation scheme, to generate a plurality of information correlations;

correlating the estimate of one of the plurality of interference components and all possible interference reference signals, each interference reference signal being one of the closed set of all possible interference signals recognized by the given interference digital modulation scheme, to generate a plurality of interference correlations;

correlating the plurality of information correlations, the plurality of interference correlations, and the first received signal to generate a plurality of decision variables; and comparing the plurality of decision variables to generate an estimate of the second information signal.

2. A method according to claim 1, wherein the generation of the plurality of decision variables is done by subtracting each combination of the plurality of information correlations and the plurality of interference correlations from the first received signal.

3. A method according to claim 1, wherein the generation of the estimate for the first information signal is done by choosing the information signal corresponding to the smallest squared decision variable.

4. In a demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, a method of reducing interference during demodulation comprising the steps of:

inputting to the processor, during the training period, a plurality of training received signals and a plurality of known information signals that correspond to the training received signals;

estimating an information fading coefficient by processing the training received signals and the known information signals and deriving estimates of a plurality of information components corresponding to the training received signals;

estimating a plurality of interference components corresponding to the training received signals by processing the training received signals and the estimates of the information components;

inputting to the processor, during the data period, a first received signal;

correlating the first received signal with the estimates of the information and interference components to generate an estimate of a first information signal corresponding to the first received signal;

wherein the generation of the estimate for the first information signal further generates an estimate for a first interference signal corresponding to the first received signal, the method further comprising the steps of:

estimating a second information fading coefficient by processing a plurality of previously received signals and a plurality of previously estimated information signals that correspond to the previously received signals and deriving estimates of a second plurality of information components that correspond to the previously received signals;

estimating a second plurality of interference components corresponding to the previously received signals by processing the previously received signals, the estimates of the second information components, and a plurality of previously estimated interference signals that correspond to the previously received signals;

inputting to the processor a second received signal; and correlating the second received signal with the estimates of the second information and interference components, to generate an estimate of a second information signal and a second interference signal corresponding to the second received signal.

5. A method according to claim 4, wherein the estimation of the second information fading coefficient and the second interference components occurs subsequent to estimating a plurality of information signals during the data period.

6. A method according to claim 4, wherein the estimation of the second information fading coefficient and the second interference components occurs directly after estimating the first information signal;

wherein the plurality of previously received signals comprises the first received signal and at least one of the plurality of training received signals.

7. A method according to claim 4, wherein the estimation of the second interference components comprises estimating a second interference fading coefficient corresponding to the previously received signals by processing the previously received signals with the estimates of the second information components removed and the previously estimated interference signals.

8. In a demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, a method of reducing interference during demodulation comprising the steps of:

inputting to the processor, during the training period, a plurality of training received signals and a plurality of known information signals that correspond to the training received signals;

estimating an information fading coefficient by processing the training received signals and the known information signals and deriving estimates of a plurality of information components corresponding to the training received signals;

estimating a plurality of interference components corresponding to the training received signals by processing the training received signals and the estimates of the information components;

inputting to the processor, during the data period, a first received signal; correlating the first received signal with the estimates of the information and interference components to generate an estimate of a first information signal corresponding to the first received signal;

wherein the TDMA time slot further comprises a second training period, further comprising the steps of:

inputting to the processor, prior to the second training period, a third received signal;

inputting to the processor, during the second training period, a second plurality of training received signals and a second plurality of known information signals that correspond to the second training received signals;

estimating a third information fading coefficient by processing the second training received signals and the second known information signals and deriving estimates of a third plurality of information components that correspond to the second training received signals;

estimating a third plurality of interference components corresponding to the second training received signals by processing the second training received signals and the estimates of the third information components; and correlating the third received signal with the estimates of the third information and interference components to generate an estimate of a third information signal corresponding to the third received signal.

9. A method according to claim 8, wherein the second known information signals contain information used by a receiver containing the processor for at least one of frame synchronization, timing recovery, and information type recovery.

10. In a demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, a method of reducing interference during demodulation comprising the steps of:

inputting to the processor, during the training period, a plurality of training received signals and a plurality of known information signals that correspond to the training received signals;

estimating an information fading coefficient by processing the training received signals and the known information signals and deriving estimates of a plurality of information components corresponding to the training received signals;

estimating a plurality of interference components corresponding to the training received signals by processing the training received signals and the estimates of the information components;

inputting to the processor, during the data period, a first received signal; correlating the first received signal with the estimates of the information and interference components to generate an estimate of a first information signal corresponding to the first received signal;

wherein each received signal further comprises another information component comprising another information signal and another information fading coefficient, the other information signal being known during the training period and not being known during the data period, the method further comprising the steps of:

inputting to the processor, during the training period, a plurality of known other information signals that correspond to the training received signals; and estimating another information fading coefficient by processing the training received signals and the known other information signals and deriving estimates of a plurality of other information components corresponding to the training received signals;

wherein the estimating a plurality of interference components further processes the estimates of the other information components; and wherein the correlating the first received signal with the estimates of the information and interference components further correlates the first received signal with the other information components and further generates an estimate of a first other information signal corresponding to the first received signal.

11. A demodulator that takes as input a series of received signals from a single antenna receiver system within a time division multiple access (TDMA) time slot, each received signal comprising an information component and an interference component, both components comprising a signal and a fading coefficient, the TDMA time slot comprising a training period when the information signals are known at the processor and a data period when the information signals are not known, the demodulator comprising:

an estimation stage for generating an estimation of an information fading coefficient upon receipt of a plurality of training received signals and a corresponding plurality of known information signals during the training period;

an interference demodulation stage for generating estimations of a plurality of interference components corresponding to the training received signals upon receipt of the training received signals and estimations of a plurality of corresponding information components comprising the estimation of the information fading coefficient and the known information signals;

a correlation stage for generating an estimation of a first information signal corresponding to a first received signal by correlating the first received signal with the estimations of the information and interference components;

wherein the interference demodulation stage comprises:

an interference component isolator for generating estimations of a plurality of interference components by estimating the training received signals with the corresponding information components removed;

an interference demodulator for generating estimations of a plurality of interference signals corresponding to the training received signals upon receipt of the estimations of the interference components;

a second fading coefficient estimator for generating an estimation of an interference fading coefficient upon receipt of the estimations of the interference components and the estimations of the interference signals;

wherein the estimation stage comprises a first fading coefficient estimator; and wherein the first and second fading coefficient estimators are of the same apparatus.

12. A receiver coupled to a single antenna comprising:

a gain controller coupled to the antenna, that amplifies the signals input from the antenna;

an analog to digital converter coupled to the gain controller that converts the output from the gain controller into digital format;

a receiver filter coupled to the analog to digital converter that generates a series of received signals within a time division multiple access (TDMA) time slot, each received signal comprising an information component and an interference component, both components comprising a signal and a fading coefficient, the TDMA time slot comprising a training period when the information signals are known at the processor and a data period when the information signals are not known;

a first demodulator that takes as input the series of received signals comprising:

an estimation stage for generating an estimation of an information fading coefficient upon receipt of a plurality of training received signals and a corresponding plurality of known information signals during the training period;

an interference demodulation stage for generating estimations of a plurality of interference components corresponding to the training received signals upon receipt of the training received signals and estimations of a plurality of corresponding information components comprising the estimation of the information fading coefficient and the known information signals;

a correlation stage for generating an estimation of a first information signal corresponding to a first received signal by correlating the first received signal with the estimations of the information and interference components;

a second demodulator that takes as input the series of received signals, a detector that determines a critical performance factor corresponding to the series of received signals; and a switching means for disabling one of the first and second demodulators and enabling the other one of the first and second demodulators if the critical performance factor is within a predetermined threshold range, and enabling the one of the first and second demodulators and disabling the other one of the first and second demodulators if the critical performance factor is not within the predetermined threshold range.

13. A receiver according to claim 12, wherein the critical performance factor is a signal to interference plus noise ratio (SINR).

14. A receiver according to claim 13, wherein the second demodulator is a conventional demodulator; and the switching means disables the first demodulator and enables the second demodulator if the SINR is above 6 dB, and enables the first demodulator and disables the second demodulator if the SINR is below 6 dB.

* * * * *